US 6,527,555 B1

(12) United States Patent
Storm

(10) Patent No.: US 6,527,555 B1
(45) Date of Patent: Mar. 4, 2003

(54) APPARATUS FOR INFORMATION DISPLAY IN PROGRAMMABLE AND REPROGRAMMABLE SPHERICAL DEVICES

(76) Inventor: Paul A. Storm, 310 Sequoia Rd., Boulder Creek, CA (US) 95006

( * ) Notice: Subject to any disclaimer, the term of this patent is extended or adjusted under 35 U.S.C. 154(b) by 330 days.

(21) Appl. No.: 09/624,283

(22) Filed: Jul. 24, 2000

(51) Int. Cl.[7] ............................................. G09B 27/08
(52) U.S. Cl. ...................................... 434/131; 434/130
(58) Field of Search ................................ 434/130, 106, 434/131, 284, 287, 145, 147, 217

(56) References Cited

U.S. PATENT DOCUMENTS

| | | | | |
|---|---|---|---|---|
| 5,023,725 A | * | 6/1991 | McCutchen | 358/231 |
| 5,030,100 A | * | 7/1991 | Hilderman | 434/132 |
| 5,057,024 A | * | 10/1991 | Sprott et al. | 434/146 |
| 5,519,809 A | * | 5/1996 | Husseiny et al. | 395/2.84 |
| 5,545,041 A | * | 8/1996 | Tsuzuki | 434/136 |
| 5,864,337 A | * | 1/1999 | Marvin | 345/338 |
| 5,931,677 A | * | 8/1999 | Rifat et al. | 434/131 |
| 5,945,985 A | * | 8/1999 | Babin et al. | 345/302 |
| 5,990,941 A | * | 11/1999 | Jackson et al. | 348/207 |
| 6,068,486 A | * | 5/2000 | Frank et al. | 434/135 |

* cited by examiner

Primary Examiner—Michael O'Neill
Assistant Examiner—Julie Brocketti
(74) Attorney, Agent, or Firm—Jeffrey A. Hall

(57) ABSTRACT

A programmable device for the display of information, comprising, a spherical or curved element, such as a globe, which is programmable/reprogrammable for the display of geographical, political, meteorological, biological, and cultural information. A spherical or curved element having a plurality of optical lens segments is in operable communication with programmable electronic displays, for displaying and representing information on the spherical element. The programmable displays are secured to the inside faces of lens segments so that images are directed to the outside surface of the sphere.

18 Claims, 2 Drawing Sheets

APPARATUS FOR INFORMATION DISPLAY IN PROGRAMMABLE AND REPROGRAMMABLE SPHERICAL DEVICES

BACKGROUND OF THE INVENTION

37 C.F.R. 1.77(a)(7)

1. Field of Invention

This invention relates to apparatuses for displaying information using a spherical or other curved surface which is programmable and reprogrammable, such as globes.

2. Description of the Related Art

Heretofore a wide variety of globes, maps and other representations of geographic and other information have been proposed and developed. Typically, a static printed or embossed surfaces is used on a spherical surface such as in the case of globes, or on a flat surface for maps.

An example of such prior static modifications is seen in U.S. Pat. No. 5,931,677 issued to Rifat et al. August, 1999 where surface modifications of the globe are made by removing pieces of the globe and securing different pieces in bore holes in the globe.

Another type of information display is seen in globes where the surface may be illuminated or the globe rotated and positioned to allow viewing of selected points or areas of the globe. Such disclosures are seen in U.S. Pat. No. 5,057,024 issued to Sprott, et al October, 1991 and U.S. Pat. No. 6,019,503 issued to Pfister, et al. January, 2000.

Attempts to incorporate the features of a static surface globe with other multimedia are disclosed in U.S. Pat. No. 6,027,343 issued to Ho, February 2000, and to Babin et al., August 1999. In this genre, globes are disclosed which utilize video, sound, graphic images and numerical presentations for perspective display of maps of the world or portions of the maps.

The present invention is a novel electronically programmable apparatus which may be used with globes or other curved display representations of data, allowing for the programming of individual surface element programming of illustrations. The present invention may be used with multimedia if desired. However, distinct from any prior methods or apparatus, the present invention permits the encapsulation of three dimensional space, a globe, for example, to be programmed or reprogrammed in various ways or interactive manners, so as to display temporal factors, and accordingly is not limited to static display of information.

Accordingly, it is the primary object of this invention to provide an apparatus for the display of information using a spherically shaped or otherwise curved surface display, allowing for the encapsulation and display of information in three dimensional space. The display is programmable/reprogrammable, and may be changed or updated as desired. For example, the display of political boundaries on a globe could be reprogrammed to reflect changes in political names or boundaries.

A further object is the temporal display of information which may be displayed as sequences of images, such as the simulation of animal, plant or human migrations. Further, the spherical image may be programmed to respond to user inputs, such as the user interactively modifying the rate of display of a sequence being displayed, or multiple images or combination of images can be created and displayed, such as weather data being combined with a political map or soils being correlated with animal or plant distributions.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

BRIEF SUMMARY OF THE INVENTION

37 C.F.R. 1.77(a)(8)

The present invention is a programmable device for the encapsulation and display of three dimensional information, comprising, a spherical or curved element, such as a globe, which is programmable/reprogrammable for the display of geographical, political, meteorological, biological, and cultural information.

A spherical or curved element with a plurality of optical lens segments is provided and is in operable communication with a plurality of programmable electronic displays, for displaying and representing information on the spherical element. The programmable displays are secured to the inside faces of lens segments so that images are directed to the outside surface of the sphere. A single segment being comprised of one square flat panel display coupled to a single optical lens. The electronic displays are controlled by microprocessors and are reprogrammable using an external programming device such as a computer, infrared connection modem, or wireless telephony. Alternatively a tethering cable to reprogram the sphere display may be used, or touch sensitive surfaces to allow reprogramming. In other embodiments replaceable media such as DVD's, CD/ROM's floppy disks, or electronic memory cards may be used.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE INVENTION

37 C.F.R. 1.77(a)(10)

Reference will now be made in detail to the present preferred embodiments of the invention as illustrated in the accompanying drawings.

A programmable device for the display of information, is disclosed, which preferably has a spherical or curved surface, such as a globe. The device is programmable and reprogrammable allowing for the display of geographical, political, meteorological, biological, and cultural information. The spherical or curved element has a plurality of optical lens segments in operable communication with programmable electronic displays, for displaying and representing information on the spherical element. The programmable displays are secured to the inside faces of the lens segments so that images are directed to the outside surface of the sphere. A single segment is preferably comprised of one square flat panel display coupled to a single optical lens. The electronic displays are controlled by microprocessors and are reprogrammable using an external programming device such as a computer, infrared connection modem, or wireless telephony. Alternatively, a tethering cable to reprogram the sphere display may be used, or touch sensitive surfaces to allow reprogramming. Replaceable media such as DVD's, CD/ROM's floppy disks ,or electronic memory cards may also be used in selected embodiments.

Figure 1:
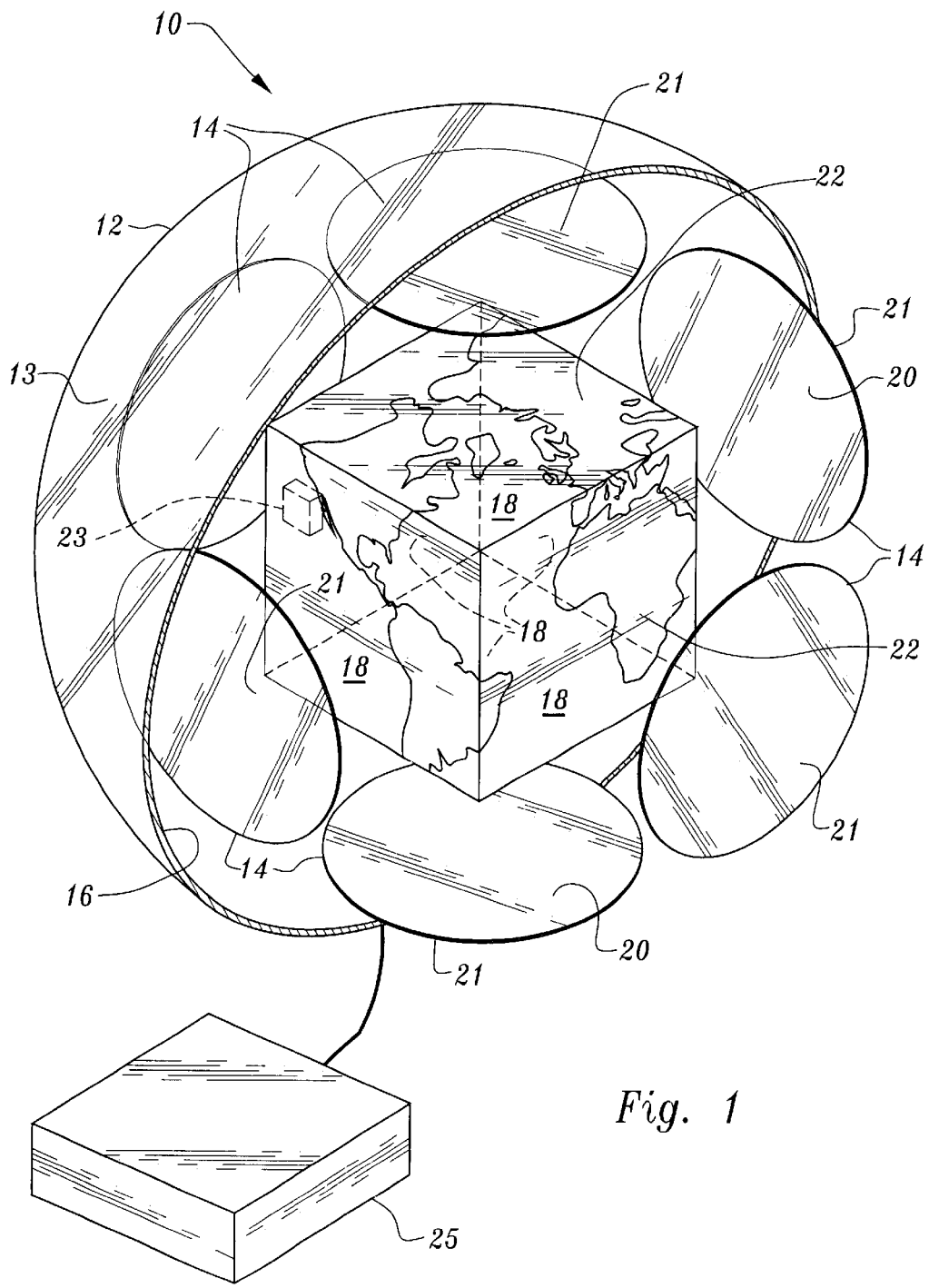
FIG. 1 shows programmable displays attached to the inside of lens segments for directing an image to the outside surface of a sphere or other curved surface, according to the invention.
Figure 2:
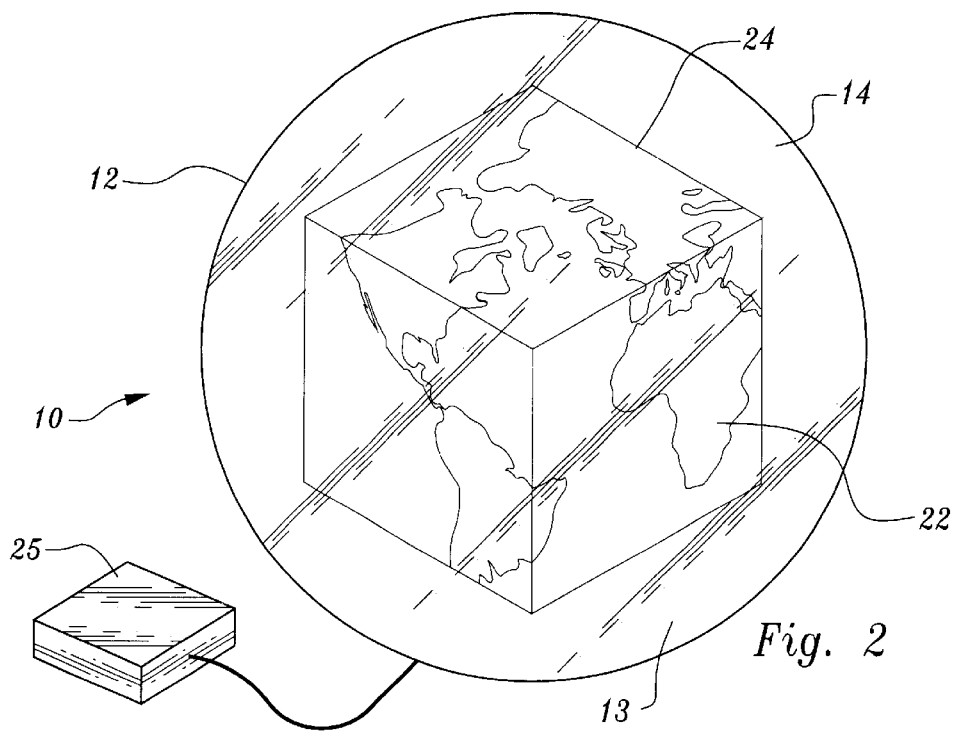
FIG. 2 shows square flat display panels in the formation of a cube within a sphere, such as a globe, according to the invention.

In FIGS. 1 and 2 , a preferred embodiment of a spherical programmable device 10 for the display of information is shown. The device may be a globe, such as illustrated in FIGS. 1 and 2, or other spherical or curved surface display of information. Preferably device 10 is made from a hollow sphere 12 composed of optical lens segments 14, combined with electronic displays 16. Programmable displays 18, which are preferably flat panel displays are attached to the inside faces 20, of lens segments 14, so that images 22 are directed to the outside'surface 13, of sphere 12.

In the preferred embodiment, there are six identical optical lens segments 14. A single lens segment preferably being composed of one square flat panel 18 display coupled to a single optical lens segment 14. The flat panel displays 18 are then formed in a cube, as seen in FIG. 2, enveloped by optical lens 14 which form a composite sphere 12. This creates a spherical display that will display the composite of the programmed individual displays, allowing for the display of geographical, political, meteorological, biological, and cultural information.

The flat panel display 18, as seen in FIG. 1, displays an image of a square digitized image. The scale of the image matches the refraction and optical properties of the optical lens segments 14. The image seen on the outside surface 21 of lens segments 14 is accordingly a true representation of the original curved image that was a projection onto the square, and is preferably corrected proportional to the outer curved surface 13 of sphere 12.

Figure 3:
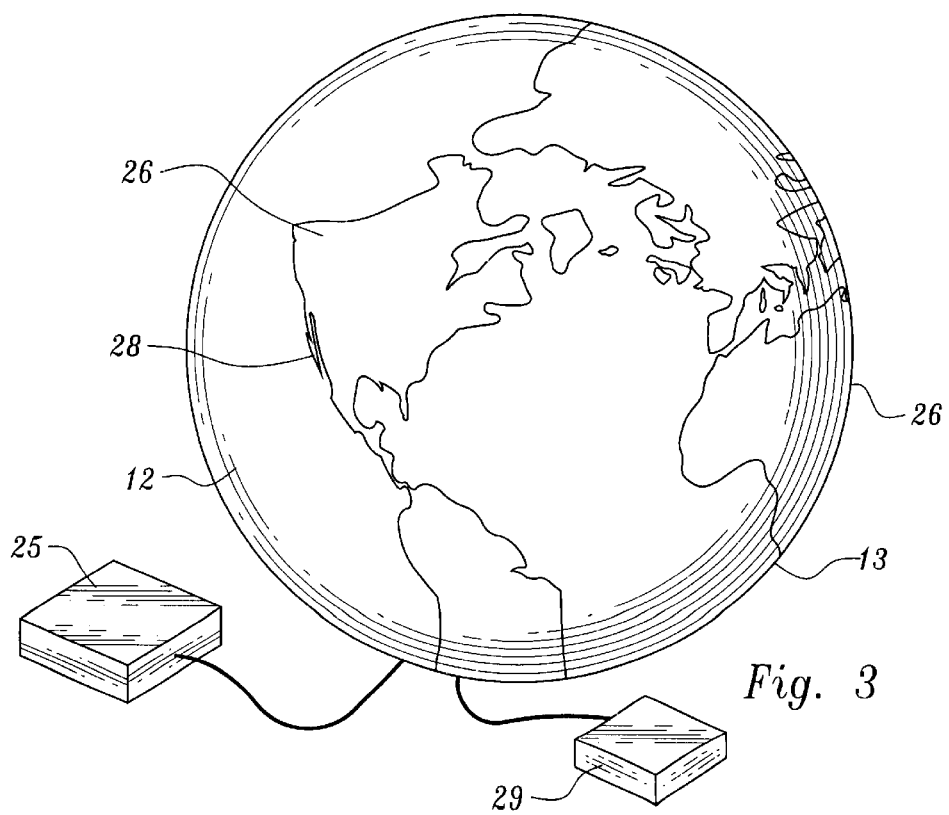
FIG. 3 shows malleable electronic displays secured to the surface of a sphere, according another embodiment of the invention.

With reference now to FIG. 3, another embodiment of the invention is shown where malleable electronic displays 26 are secured to surface 13 of sphere 12. The malleable displays 26 preferably being thin film displays curved to fit to surface 13 of sphere 12.

Device 10 may be combined with multimedia to augment or enhance the spherical display. For example, audio, data, and text, could be coordinated in various ways with the visual display on device 10. It is also possible, in alternative embodiments, to link or network two or more devices 10, so that the spherical displays could interact or complement each other, or provide for display of coordinated activities.

Displays 16 of device 10 preferably are controlled by microprocessors 23 and are reprogrammable. In the preferred embodiment the reprogramming is accomplished using an external programming device 25 seen in FIGS. 1 and 2. external programming device 25 may be a computer, infrared connection, modem, wireless telephony, keyboard or other input/output device. In other embodiments a tethering cable 29, as seen in FIG. 3 may be used. Other embodiments may utilize replaceable media such as DVD's, CD/ROM's floppy disks, or electronic memory cards.

In operation and use device 10 may be used as any spherical display that is reprogrammable and may be corrected or updated as the information requested changes. For example, a political globe can be programmed to show political boundaries and then reprogrammed to reflect changes in the political boundaries. Temporal information can be displayed and sequences of images displayed on the sphere such as animal, plant or human migrations or distributions. Star movements, the movement of tectonic plates, weather patterns, or glacial movements, for example could be programmed and shown.

Other displays can show real time movements such as the real-time displaying of airplane locations from data received from airplanes in flight. Device 10 may also be programmed to respond to user inputs allowing the user to interactively modify the rate of display of a sequence of data being displayed, Similarly, different languages may be used for the displays and a user could, for example, input his current location, such as GPS coordinates, to be shown on the display. In certain applications multiple images or combinations could be combined, such as a map of weather data combined with a political map, or a particular feature magnified or otherwise enhanced on the sphere.

As is evident from the above description, a wide variety of spherical or curved surface programmable/reprogrammable displays may be envisioned from the present disclosure, and additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A programmable device for a three-dimensional display of information, comprising:

a spherical element having a plurality of optical lens segments in operable communication with electronic display means, for displaying and representing information on the spherical element; and programmable display means for displaying selected data being secured to inner faces of said plurality of lens segments so that images are directed to an outside surface of the spherical element.

2. The programmable device for the display of information of claim 1, wherein said programmable display means are a plurality of flat panel displays.

3. The programmable device for the display of information of claim 2, wherein said plurality of square flat panel displays form a cube enveloped by said plurality of optical lenses which form a composite sphere.

4. The programmable device for the display of information of claim 2, wherein said plurality of square flat panel displays an image of a square digitized image, a scale of said digitized image matching a refraction and optical properties of said plurality of optical lens segments.

5. The programmable device for the display of information of claim 2, further including a plurality of malleable electronic displays secured to the surface of said spherical element.

6. The programmable device for the display of information of claim 5, wherein said plurality of malleable electronic displays secured to the surface of said spherical element are thin film displays.

7. The programmable device for the display of information of claim 1, wherein a single lens segment is comprised of one square flat panel display coupled to a single optical lens.

8. The programmable device for the display of information of claim 1, further including multimedia elements coordinated with said display of information.

9. The programmable device for the display of information of claim 1, further including a communicative linking of multiple programmable devices allowing for coordinated multiple displays.

10. The programmable device for the display of information of claim 1, wherein said spherical element is a globe.

11. The programmable device for the display of information of claim 1, wherein said electronic display means are controlled by microprocessors.

12. The programmable device for the display of information of claim 1, wherein said electronic display means are reprogrammable using an external programming device.

13. A programmable/reprogrammable globe for a display of geographical, political, meteorological, biological, and cultural information, comprising:

a spherical globe element having a plurality of optical lens segments in operable communication with electronic display means, for displaying and representing information on the spherical element; and programmable display means for displaying selected data being secured to selected inner faces of said plurality of optical lens segments so that images are directed to an outside surface of the spherical element.

14. The programmable globe of claim 13, wherein said programmable display means are a plurality of flat panel displays.

15. The programmable globe of claim 13, wherein said flat panel displays are secured to inside faces of the plurality of lens segments so that a projected image is directed to the outside surface of said sphere.

16. The programmable globe of claim 13, wherein a single lens segment is comprised of one square flat panel display coupled to a single optical lens.

17. The programmable globe of claim 13, wherein said electronic display means are controlled by microprocessors.

18. The programmable globe of claim 13, wherein said electronic display means are reprogrammable using an external programming device.

* * * * *